(12) United States Patent
Lam et al.

(10) Patent No.: US 6,782,276 B1
(45) Date of Patent: Aug. 24, 2004

(54) SIGNALING AGGREGATOR AND METHOD FOR USE IN A SIGNALING NETWORK

(75) Inventors: Man Tat Lam, Nepean (CA); Bashar S. Bou-Diab, Ottawa (CA); Matthew C. Jackson, Raleigh, NC (US)

(73) Assignee: Nortel Networks Limited, Montreal (CA)

( * ) Notice: Subject to any disclaimer, the term of this patent is extended or adjusted under 35 U.S.C. 154(b) by 680 days.

(21) Appl. No.: 09/718,277

(22) Filed: Nov. 22, 2000

Related U.S. Application Data (60) Provisional application No. 60/191,888, filed on Mar. 23, 2000.

(51) Int. Cl.$^7$ ............................................. H04M 1/00
(52) U.S. Cl. ...................... 455/560; 455/453; 455/445
(58) Field of Search ............................ 455/560, 445, 455/426.1, 561, 453, 433

(56) References Cited

U.S. PATENT DOCUMENTS

| | | | |
|---|---|---|---|
| 3,959,595 A | 5/1976 | Smith | 370/537 |
| 4,021,619 A | 5/1977 | Potter et al. | 370/375 |
| 4,726,017 A | 2/1988 | Krum et al. | 370/449 |
| 4,760,570 A | 7/1988 | Acampora et al. | 370/417 |
| 5,509,053 A | 4/1996 | Gowda et al. | 455/456.1 |
| 6,052,369 A | 4/2000 | Hamalainen et al. | 370/389 |
| 6,064,892 A * | 5/2000 | Miyagawa et al. | 455/560 |
| 6,081,601 A | 6/2000 | Ravivisto | 380/270 |
| 6,097,950 A | 8/2000 | Bertacchi | 455/432.2 |
| 6,208,864 B1 * | 3/2001 | Agrawal et al. | 455/445 |
| 6,324,402 B1 * | 11/2001 | Waugh et al. | 455/445 |

* cited by examiner

*Primary Examiner*—Sinh Tran
*Assistant Examiner*—Huy Nguyen
(74) *Attorney, Agent, or Firm*—Pearne & Gordon LLP (57) ABSTRACT

A signaling aggregator and method for signal aggregation alleviate port exhaustion at network nodes such as mobile switching centers (MSCs), home location registers (HLRs), and other signaling network nodes. The signaling aggregator is inserted between any signaling node requiring a plurality of signaling links, to relieve signaling port exhaustion. The signaling aggregator is connected to the signaling node by a high-speed linkset and transparently transfers signaling messages between the signaling node and other signaling nodes connected to the signaling aggregator. The signaling aggregator masquerades as the signaling node to the other signaling nodes, utilizing the point code of the signaling node in the originating point code (OPC) field of signaling messages sent to the other signaling nodes. The signal aggregator may also provide protocol conversion between two or more signaling protocols. Mated signaling aggregators are used to provide redundancy.

29 Claims, 11 Drawing Sheets

SIGNALING AGGREGATOR AND METHOD FOR USE IN A SIGNALING NETWORK

CROSS-REFERENCE TO A RELATED APPLICATION

This application claims the benefit of U.S. Provisional Application No. 60/191,888 filed Mar. 23, 2000.

TECHNICAL FIELD OF THE INVENTION

The present invention relates in general to telecommunications signaling network implementations and, in particular, to a signaling network element that serves as a signaling aggregator for use in an out-of-band signaling network.

BACKGROUND OF THE INVENTION

It is well known that the use of telecommunications services is growing at unprecedented rates. Not only is usage growing rapidly, but the size of the subscriber base is also growing. This is particularly true for wireless services such as cellular telephone and personal communications system (PCS) wireless services.

As is well known, modern telephone networks employ an out-of-band signaling network for call setup and control known as "common channel signaling" (CCS). The currently most widely used implementation of common channel signaling is Signaling System 7 (SS7). The SS7 protocol was designed without comprehension of the network size or usage requirements to which the modern Public Switched Telephone Network (PSTN) is being subjected. Consequently, parts of the PSTN are experiencing what is referred to as "signaling port exhaustion". Signaling port exhaustion occurs when the capacity for connecting signaling links to a network node is consumed. Signaling port exhaustion is particularly common in wireless services networks because of rising demand for connectivity as a result of explosive subscriber growth. The problem is further exacerbated by the fact that certain elements in the wireless telephone network require "fully associated" signaling links. A fully associated signaling link is a direct link between two signaling elements in the network. To date, the only solution for supporting such signaling elements has been the expansion of signaling port capacity at an associated element such as a mobile switching center, which supports a plurality of base station controllers in a wireless communication network. The only alternative would be to upgrade the base station controllers to permit them to support quasi-associated signaling. This is, however, a very expensive alternative which appears to be untenable in today's competitive telecommunications environment.

There therefore exists a need for a signaling network element that is adapted to help reduce signaling port exhaustion in an out-of-band signaling network such as a common channel signaling network to permit the signaling network to be expanded to service the needs of a growing number of telecommunications services subscribers.

SUMMARY OF THE INVENTION

It is therefore an object of the invention to provide a network element adapted to relieve signaling port exhaustion in an out-of-band signaling network.

The invention therefore provides a new signaling network element for aggregating signaling network traffic in a telecommunications signaling network in order to reduce signaling port exhaustion. The new network element permits an economical expansion of the network to support a larger subscriber base. The signaling network element is referred to as a Signaling Aggregator (SA). The SA is associated with one or more network nodes and mimics those nodes to the rest of the signaling network, so that network nodes incapable of quasi-associated signaling require no modification. The SA may also be provisioned to perform protocol conversions to permit elements to be connected to the signaling network that are not adapted to receive messages in the signaling protocol of the network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides a new signaling network element hereinafter referred to as a Signaling Aggregator (SA). The SA relieves signaling port exhaustion in a out-of-band signaling network, such as a common channel signaling network, by aggregating signals from a plurality of low-speed signaling links onto a high-speed and high-capacity signaling linkset. In order to obviate any requirement to upgrade or reconfigure other signaling nodes in the signaling network, the SA mimics signaling node(s) with which it is associated to the rest of the network. Network elements that require fully associated signaling links are therefore supported without modification. The SA in accordance with the invention is therefore economically installed in a signaling network without disruption and functions substantially transparently to all elements of the network.

Figure 1:
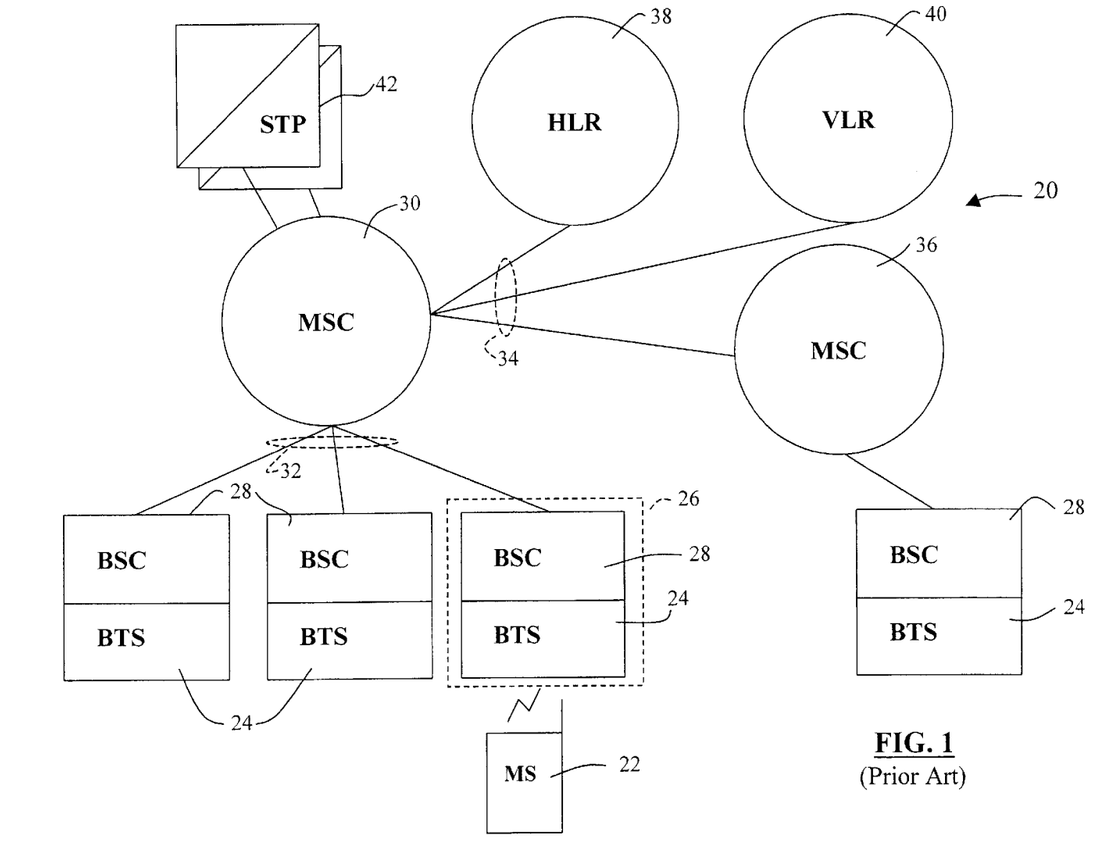
FIG. 1 is a block diagram illustrating a prior art GSM telecommunications network.

FIG. 1 is a block diagram illustrating a wireless Global System for Mobile Communications (GSM) network 20 in accordance with the prior art. The GSM network 20 supports wireless telephone devices referred to as mobile stations (MS) 22. Each MS 22 is connected by a wireless connection to a base transceiver station (BTS) 24. A base station sub-system (BSS) 26 includes a base station controller (BSC) 28 and at least one BTS 24 which is controlled by the BSC 28. A mobile services switching center (MSC) 30 generally controls a plurality of base station sub-systems 26. Each of the BSCs 28 is connected to the MSC 30 by a digital signaling linkset 32 in a fully associated manner. The MSC 30 is also connected by signaling links 34 to other GSM network nodes such as other MSCs 36, a home location register (HLR) 38, a visitor location register (VLR) 40, signal transfer points (STPs) 42, and other network elements. The STPs 42 connect the MSC 30 to service control points (SCPs) (not shown) and to other telephone networks such as the Public Switched Telephone Network (PSTN). As is well understood in the art, a GSM network 20 is generally provisioned with International Telephone Union (ITU) Signaling System #7 (SS7) Signaling Protocol, which is well known in the art.

As is also well known in the art, certain of the signaling elements in the network shown in FIG. 1 have limited signaling functionality and do not implement a full SS7 protocol stack. The BSCs 28 are one example. They are connected to the MSC 30 by direct signaling links, and are only configured to work in a point-to-point signaling configuration because the BSCs 28 only support a single far-end point code.

Figure 2:
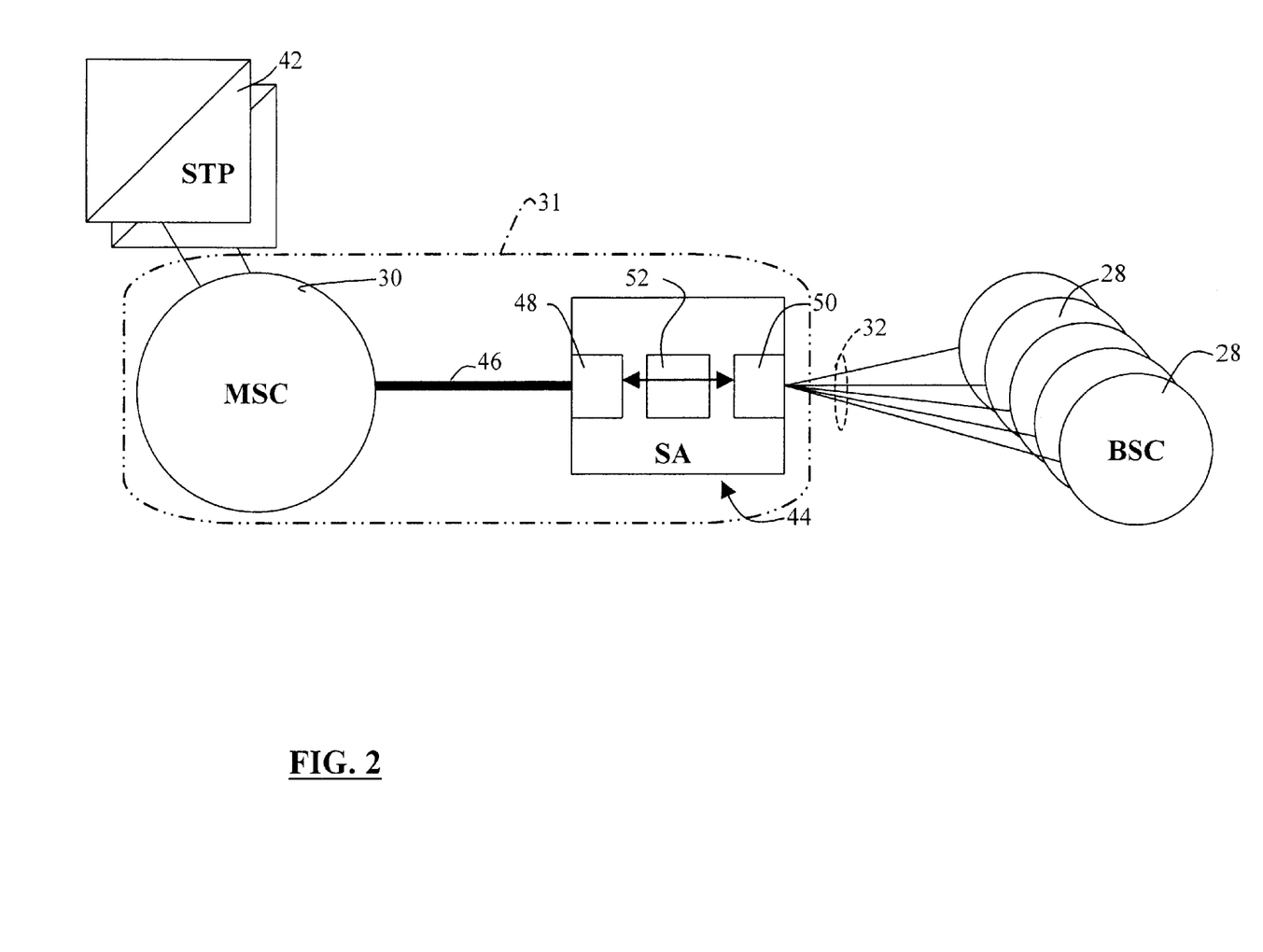
FIG. 2 is a block diagram illustrating an exemplary GSM telecommunications network that includes a Signaling Aggregator in accordance with an embodiment of the present invention.

FIG. 2 is a schematic diagram of a portion of the network shown in FIG. 1, showing a Signaling Aggregator (SA) 44 in accordance with the invention. The SA 44 terminates a plurality of signaling linksets 32 connected to BSCs 28 and aggregates signaling messages destined to the MSC 30 over a single high-capacity signaling linkset 46. Signaling port exhaustion on the MSC 30 is thereby relieved, permitting more BSCs 28 to be controlled by the MSC 30 or, alternatively, for the MSC 30 to be connected to a greater number of other nodes in the network, or in other networks. At a physical layer, the linkset 46 consists of high-speed links (ATM or IP based) having a high capacity to provide at least a 2:1, for example, aggregation ratio of the relatively low speed signaling linksets 32 (typically 64 Kbps). Alternatively, the linkset 46 can be implemented as an aggregate of low-speed, parallel linksets. The SA 44 may be, for example, a conventional signal transfer point (STP) provisioned with high signaling capacity and configured by software, hardware or firmware to provide the functionality of the SA 44 described below. The SA 44 includes at least one device 48 for terminating the signaling linkset 46. The device 48 is, for example, a card for supporting one or more signaling ports in a manner well known in the art. The SA 44 also includes devices 50 for terminating the signaling linksets 32. The devices 50 are likewise, for example, cards supporting one or more signaling ports. An aggregator proxy 52 transparently and selectively transfers signals between the devices 48 and 50, as will be explained below in more detail.

In accordance with the invention, the SA 44 mimics the MSC 30 to the BSCs 28 because the BSCs 28 are not capable of quasi-associated signaling. The SA 44 is therefore transparent to the BSCs 28. The MSC 30 is, however, capable of quasi-associated signaling and the SA 44 is therefore visible to the MSC 30 with which it is associated. As viewed by the BSCs 28, however, the MSC 30 and associated SA 44 are perceived as a virtual MSC 31. Thus, BSCs 28 that support less than full SS7 protocol level 3 (L3) functionality may be connected to the virtual MSC 31 without alteration. The SA 44 mimics the MSC 30 to the BSCs 28 by accepting messages addressed to the point code of the MSC 30. As will be understood by those skilled in the art, the SA 44 must also provide message transfer part (MTP) functionality in order to operate under the SS7 protocol. The SA 44 must therefore modify normal L3 routing in traffic management message signaling units (MSUs) to appear substantially transparent to the BSCs 28 while keeping the MSC 30 informed of the status of the associated BSCs 28.

Figure 3:
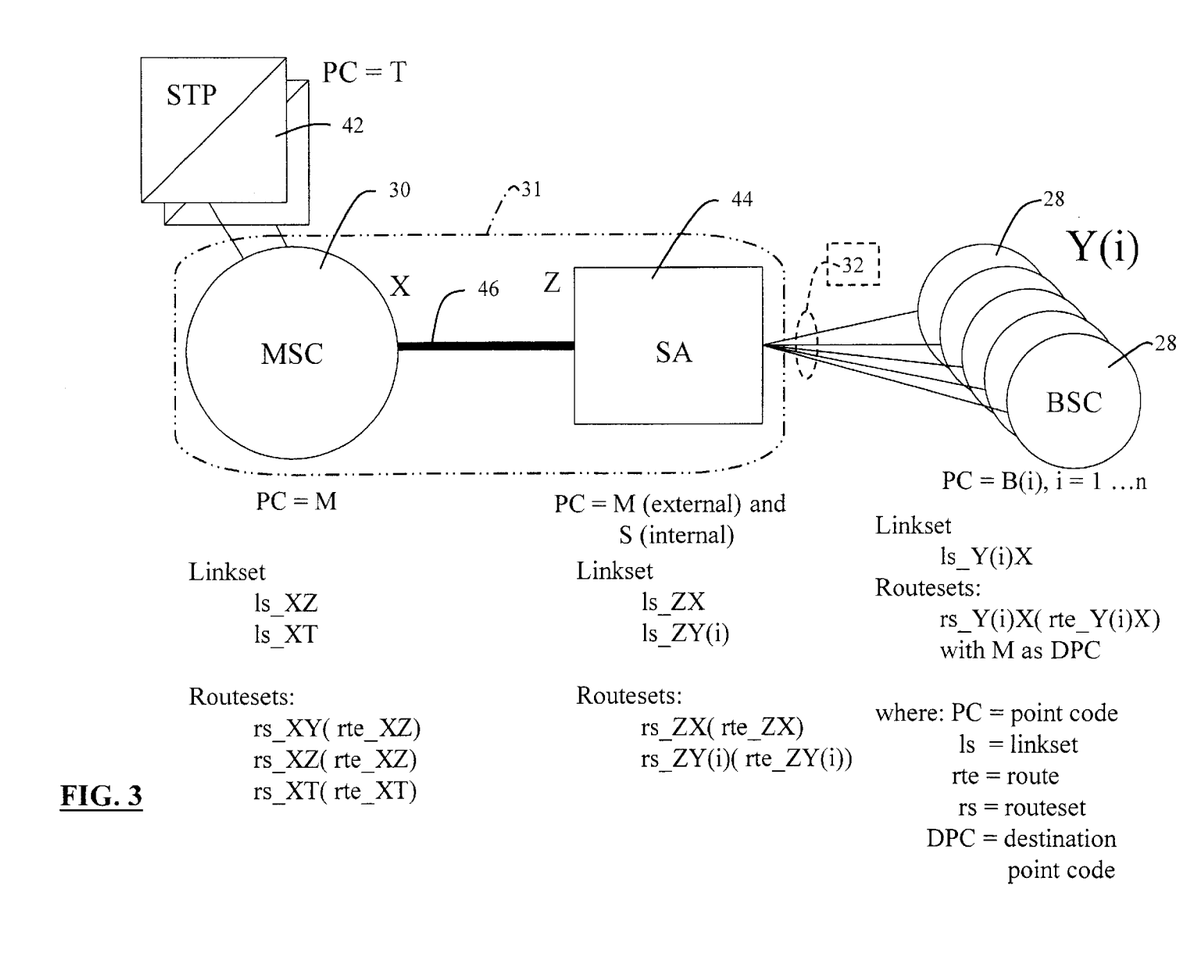
FIG. 3 is a block diagram illustrating an exemplary GSM telecommunications network provisioned with linkset and routeset tables in accordance with the embodiment of the invention shown in FIG. 1.

FIG. 3 is a schematic diagram of the network configuration shown in FIG. 2, illustrating exemplary linkset and routeset tables for SS7 signaling traffic flows between the MSC 30 and the BSCs 28 provisioned with an SA 44 in accordance with the invention. For simplicity of illustration, capital letters are used for identifying the respective network elements for the sake of defining linksets and routesets. The STPs are therefore identified by the letter T; the MSC 30 is identified by the letter X; the SA 44 is identified by the letter Z; and, the BSCs 28 are identified by the letters Y(i) where i=1 . . . n. Furthermore, for the sake of illustration, the point codes of the respective network elements are represented by capital letters. The MSC 30 has a point code "M". The SA 44 has two point codes. The point code "M" is used externally because the SA 44 mimics the MSC 30 to the rest of the network, as described above. The internal point code of the SA 44 is, however, represented by the letter "S". The internal point code of the SA 44 is only known to the MSC 30, and the MSC 30 and the SA 44 form the virtual MSC 31, as described above. As is apparent, the MSC 30 recognizes only two linksets, a linkset ls_XZ (linkset 46) and a linkset ls_XT which connects the MSC 30 to the STPs 42. The SA 44 has a linkset ls_ZX that connects the SA 44 to the MSC 30 via linkset 46, and a linkset ls_ZY$_{(i)}$ that connects the SA 44 to the BSCs 28 via linksets 32. Each BSC 28 has only one linkset, ls_Y$_{(i)}$X, since the BSCs, as explained above, typically support only point-to-point, fully associated signaling connections.

As is also shown in FIG. 3, the routesets for the MSC show that the signaling routes to the BSCs (Y) use routesets rs_XY$_{(i)}$ (rte_XY$_{(i)}$). As is also shown in FIG. 3, the routesets from the BSCs 28 are perceived as direct links between the BSCs (Y) and the MSC (X) and M is used as the destination point code (DPC). Each signaling message sent from a BSC 28 is therefore assigned a destination point code (DPC) of M, the point code of the MSC 30. As explained above, SA 44 accepts all messages received by devices 50 (FIG. 2) having a point code M, and the aggregator proxy 52 aggregates the messages onto the linkset 46 without changing the DPC or an originating point code (OPC) of the message.

Figure 4:
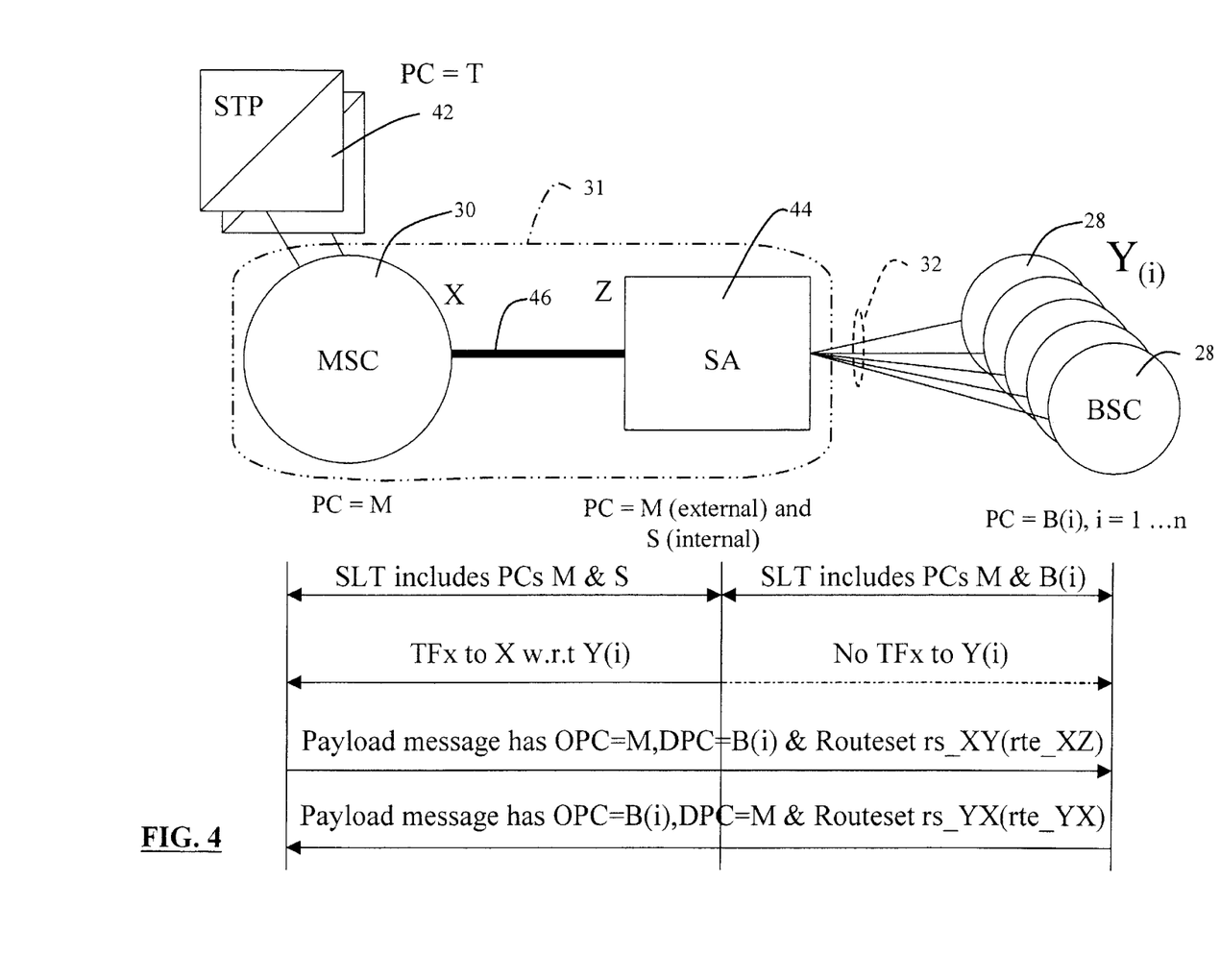
FIG. 4 is a block diagram illustrating signaling traffic flow in the exemplary GSM telecommunications network shown in FIG. 3.

FIG. 4 illustrates signaling message traffic flow from the MSC 30 to the BSCs 28, and vice versa. Signaling link management messages such as signal link test (SLT) messages are generated by MSC 30 and each of the BSCs 28, as well as by the SA 44. The SA 44 uses its internal point code "S" when generating SLT messages that are sent to the MSC 30. The SA 44, however, uses the point code "M" when generating SLT messages for the BSCs 28 in order to mimic the MSC 30. In order to indicate the status of the respective BSCs 28, the SA 44 generates route management messages expressed as TFx. The route management messages include messages such as transfer-prohibited (TFP), transfer-allowed (TFA), transfer-restricted (TFR), etc. Because the BSCs 28 do not receive TFx messages which are handled by the MSC X. Consequently, the SA 44 does not send TFx messages to the BSCs. However, SA 44 does need to keep the BSCs 28 informed of the status of MSC 30 and, in turn, the status of linkset 46 as well. If MSC X or linkset 46 fails, SA 44 will take all links to BSCs Y out of service. This is in accordance with the behavior of the system without SA 44.

For signaling payload messages, the MSC 30 uses its own point code M as the originating point code (OPC) in the messages, and routes the messages to the respective BSCs 28 through the SA 44 using a destination point code (DPC) of Y(i). Payload signaling messages sent from the respective BSCs 28 to the MSC 30 contain the respective point codes Y(i) in the OPC and M in the DPC. As explained above, those messages are transparently forwarded by the SA 44.

The MSC 30 typically handles SS7 level 3 signaling network management (SNM) messages for linkset or node failure management. Consequently, SA 44 may notify the MSC 30 if transmission problems occur between SA 44 and the BSCs 28. Such notifications may be accomplished by sending a TFP[Y(i)] message to the MSC 30. If a failure occurs on linkset 46, the SA 44 may disable the links in linksets 32 for the respective BSCs 28. The SA 44 may perform the same action in the event that the MSC 30 becomes inoperative. In either case, the SA 44 returns the linksets 32 to service after linkset 46 is back in service. If the SA 44 fails, the MSC 30 and the BSCs 28 react as they would if directly connected and failure occurred on all linksets.

Figure 5:
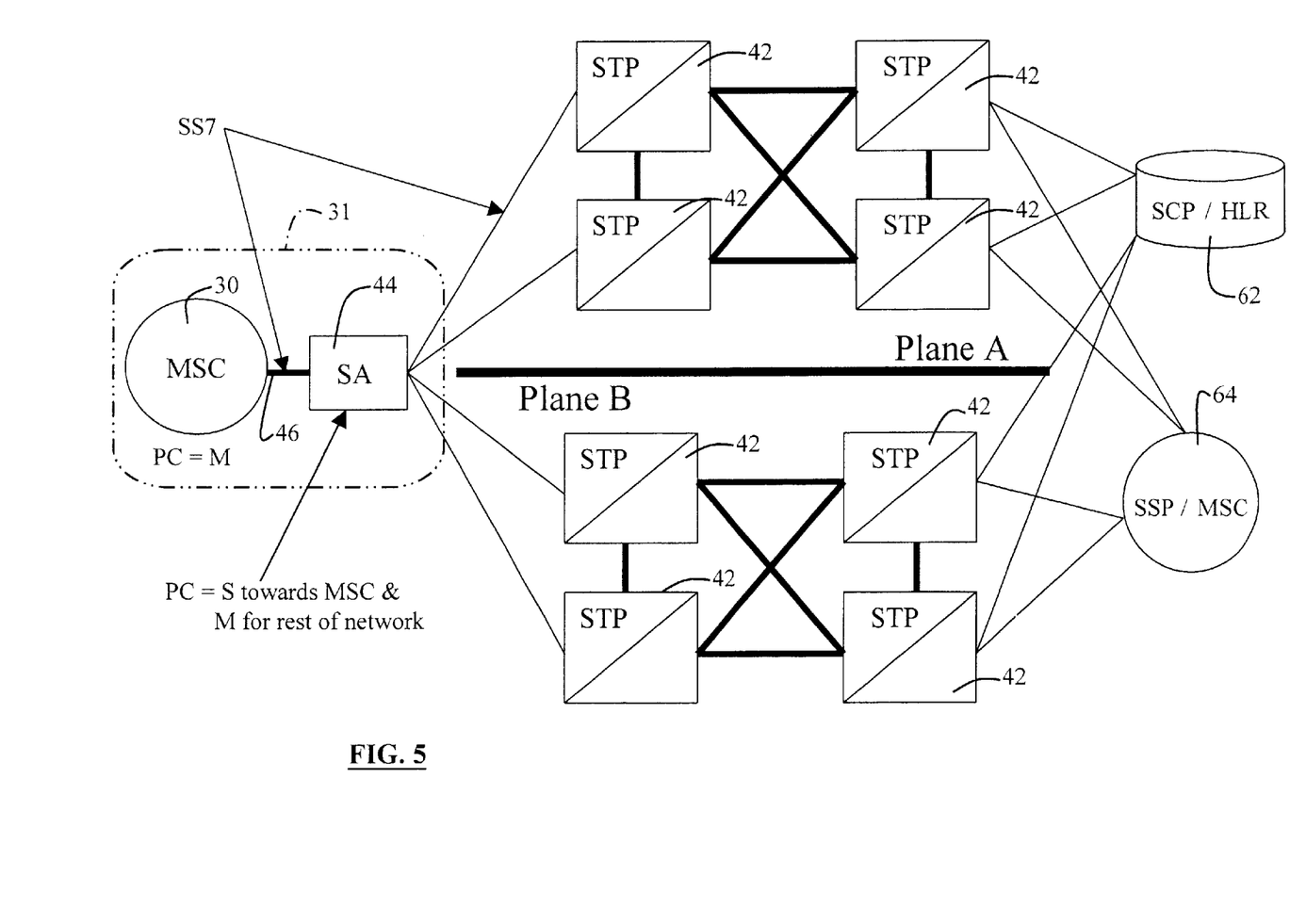
FIG. 5 is a block diagram illustrating an alternative exemplary MTX telecommunications network that includes a Signaling Aggregator in accordance with the first embodiment of the invention used to aggregate signaling messages sent through mated STPs.

FIG. 5 is a schematic diagram of another network configuration in which the SA 44 is adapted to enable equal cost linksets in a multiple-plane network configuration. In the example shown in FIG. 5, the SA 44 supports 4×L (where 4 represents the number of linksets, and L is integer that is less than or equal to 16 and represents the number of links in each of the 4 linksets) equal-cost linksets in a multiple-plane network configuration. The 4×L equal priority linkset to mated STPs 42 in the respective planes A and B of the network configuration shown in FIG. 5 provide increased capacity and high network reliability. As explained above, the MSC 30 and the SA 44 form a virtual node 31 which appears to the remainder of the network as a single node. As also explained above, the SA 44 uses a point code S when communicating with the MSC 30 and the point code M (the point code of the MSC 30) when sending or receiving messages from the rest of the network. As is further apparent, the presence of the SA 44 contributes significantly to reduction of signaling port exhaustion on the MSC 30. A service control point (SCP) or home location register (HLR) 62 and a service switching point (SSP) or another MSC 64 illustrate the signaling ports required on those nodes for supporting signaling links to the multiple-plane network configuration in the absence of the SA 44.

Figure 6:
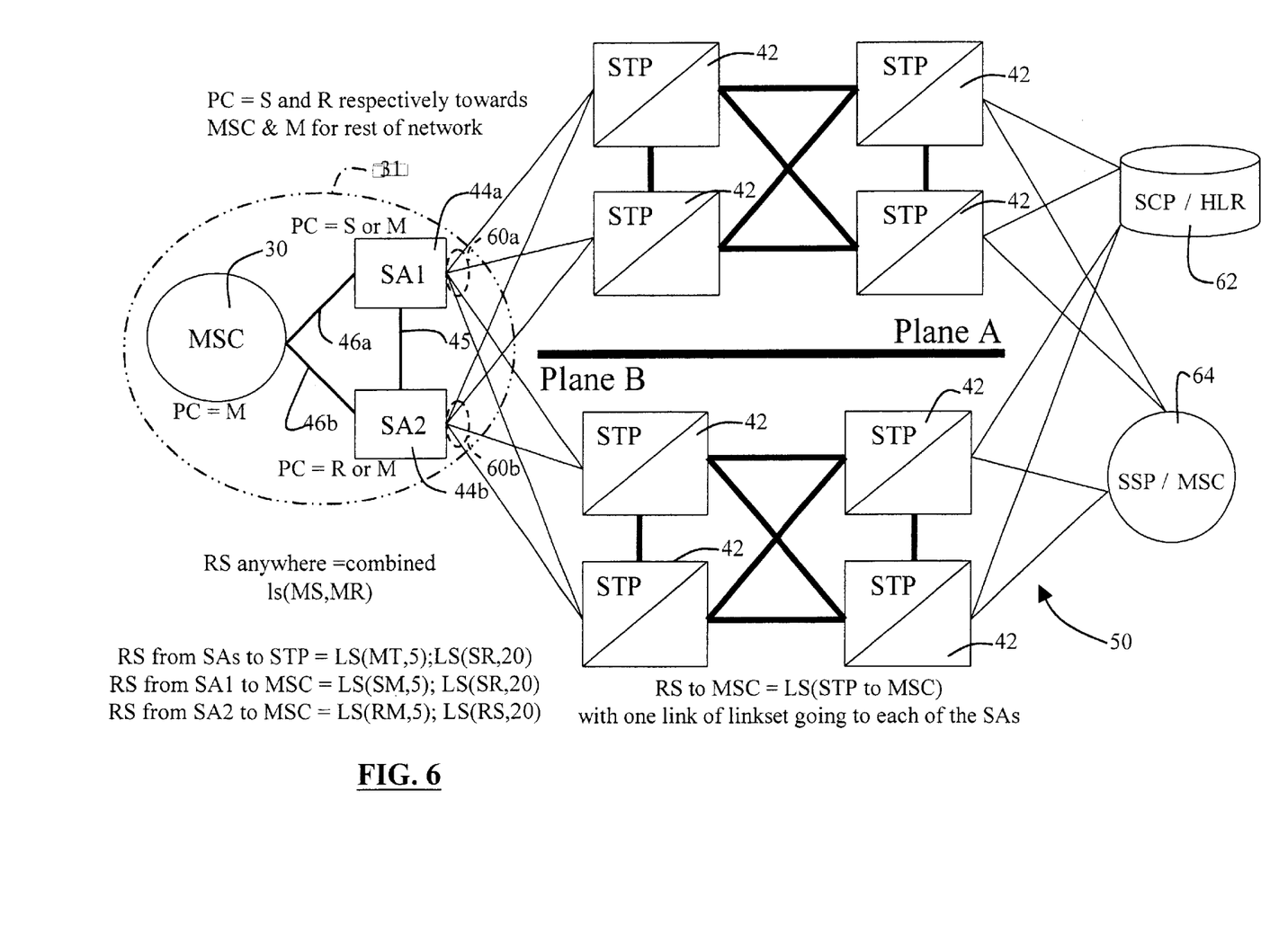
FIG. 6 is a block diagram illustrating an alternative exemplary MTX telecommunications network provisioned with mated signaling aggregators in accordance with the invention, respectively used to aggregate signaling messages sent through mated STPs.

FIG. 6 illustrates a further network configuration in which reliability of the signaling network is enhanced by using mated SAs 44a, 44b to interface the MSC 30 with the STPs 42 of the multiple-plane network configuration. SA 44a has a point code S known to the MSC 30, while SA 44b has a point code R known to the MSC 30. Both SAs 44a and 44b use point code M and mimic the MSC 30 when sending or receiving signaling messages to the balance of the multiple-plane network. The combination of the three nodes, MSC 30, SA 44a SA 44b, form a virtual node 31 which mimics the MSC 30 to the remainder of the multiple-plane network 50. The structure of the remainder of the multiple-plane network 50 is the same as described above with reference to FIG. 5.

In the event of a linkset failure on signaling linksets 46a, 46b, which connect to SAs 44a, 44b to the MSC 30, or failure of the MSC, the SAs 44a, 44b will take down the respective links to the STPs, for example by generating LPO messages on the concerned links. The SAs 44a, 44b may tandem route to the MSC 30 all incoming messages except signaling link test (SLT) messages; change over order (COO) messages and change over answer (COA) messages, emergency change over (ECO) message, and emergency change over answer (ECA) messages; change back directive (CBD) and change back answer (CBA); link inhibit (LIN) and link inhibit answer (LIA); link uninhibit (LUN) and link uninhibit answer (LUA); link inhibit denied (LID); link forced inhibit (LFI) ; local link inhibit test (ILT) and inhibit remote test (IRT).

FIG. 6 also shows an example of a routeset from SAs 44a, 44b to an STP 42 having a point code of T as well as routesets for the respective SAs 41a, 41b to the MSC 30. As shown in FIG. 6, each linkset (LS) indicates a source and destination, followed by a relative cost of using the linkset. Thus, the linksets for SAs 44a, 44b to the STP 42 with point code "T" include a direct route MT with a cost of 5 and an indirect route (SR) through the paired SAs with a cost of 20. With respect to the linksets to MSC 30, the direct link (SM) has a cost of 5 while the indirect linkset (SR) through the paired SA 44b has a cost of 20. Likewise, for SA 44b, the direct route (RM) has a cost of 5 while the indirect route (RS) through the paired SA 44a has a cost of 20. The respective cost factors force the SAs 44a, 44b to choose the lower cost in-service route for transferring messages to the MSC 30. Otherwise, the alternate higher cost in-service route may be selected.

Figure 7:
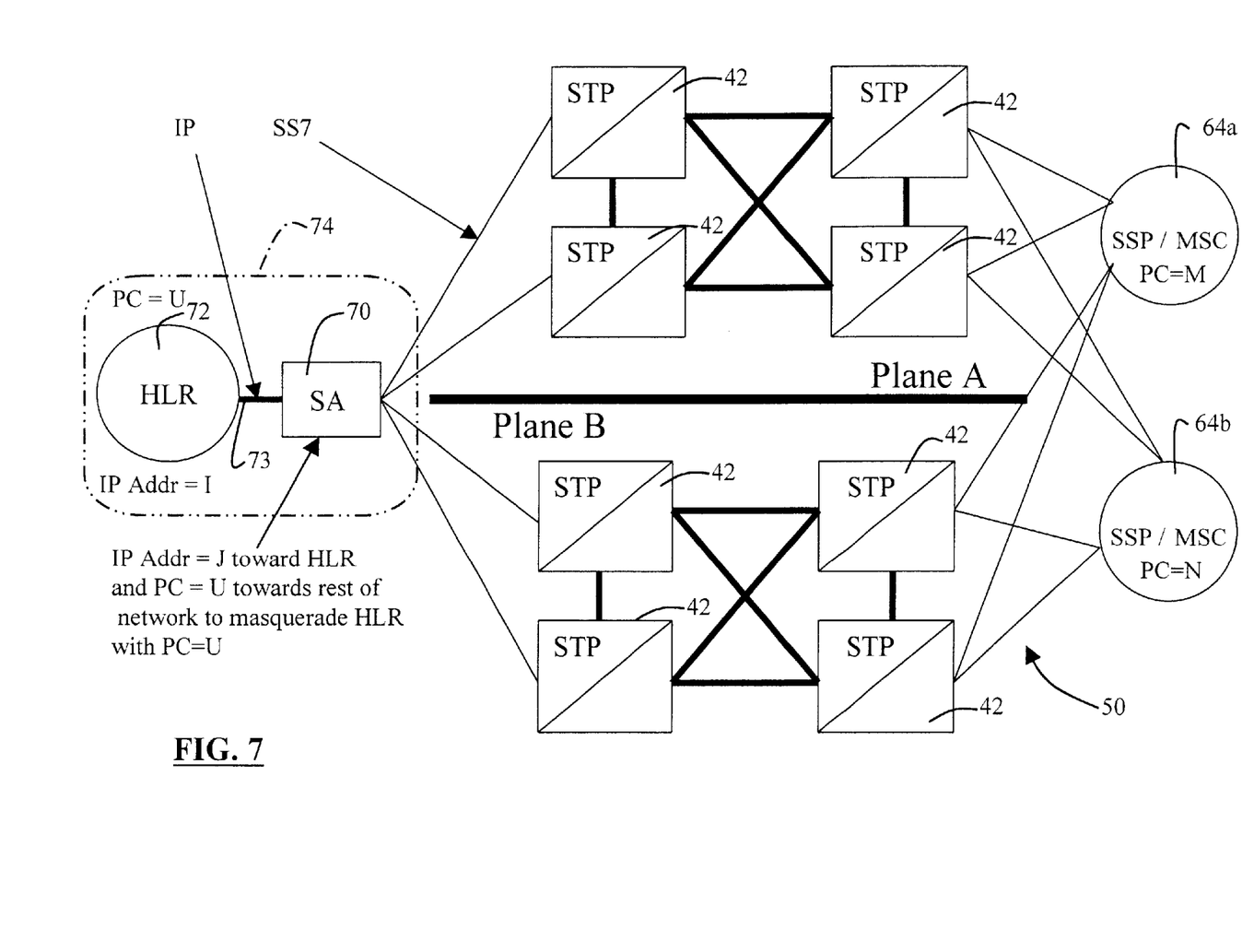
FIG. 7 is a block diagram illustrating a further exemplary MTX telecommunications network in which a Signaling Aggregator in accordance with the invention aggregates signaling message traffic and provides protocol conversion for a single network node.

FIG. 7 is a schematic diagram illustrating another embodiment of a Signaling Aggregator in accordance with the invention. In this embodiment, an SA 70 masquerades as a Home Location Register (HLR) 72 to the remainder of the multiple-plane network 50. The HLR 72 is an Internet Protocol (IP) node having an IP linkset 73 to the SA 70, and SA 70 performs a protocol conversion from SS7 to IP signaling protocol, and vice versa, to permit the HLR 72 to be transparently connected to the multiple-plane network 50. As shown in FIG. 7, the HLR 72 has an IP address "I" and a point code "C". The SA 70 also has an IP address "J", of which only HLR 72 is aware. The SA 70 has a point code "V" used to mimic the HLR 72 to the remainder of the multiple-plane network 50. The sending and receiving of signaling messages is similar to that described above. The combination of HLR 72 and SA 70 from the virtual node 74 which, to the multiple-plane network 50, appears as an HLR having a point code of "C". When sending payload or link maintenance messages, the SA 70 mimics the HLR. In the event of a linkset failure or HLR node failure, the messaging proceeds as described above with reference to FIG. 6, with required compensation for the IP signaling, which is well understood in the art.

Figure 8:
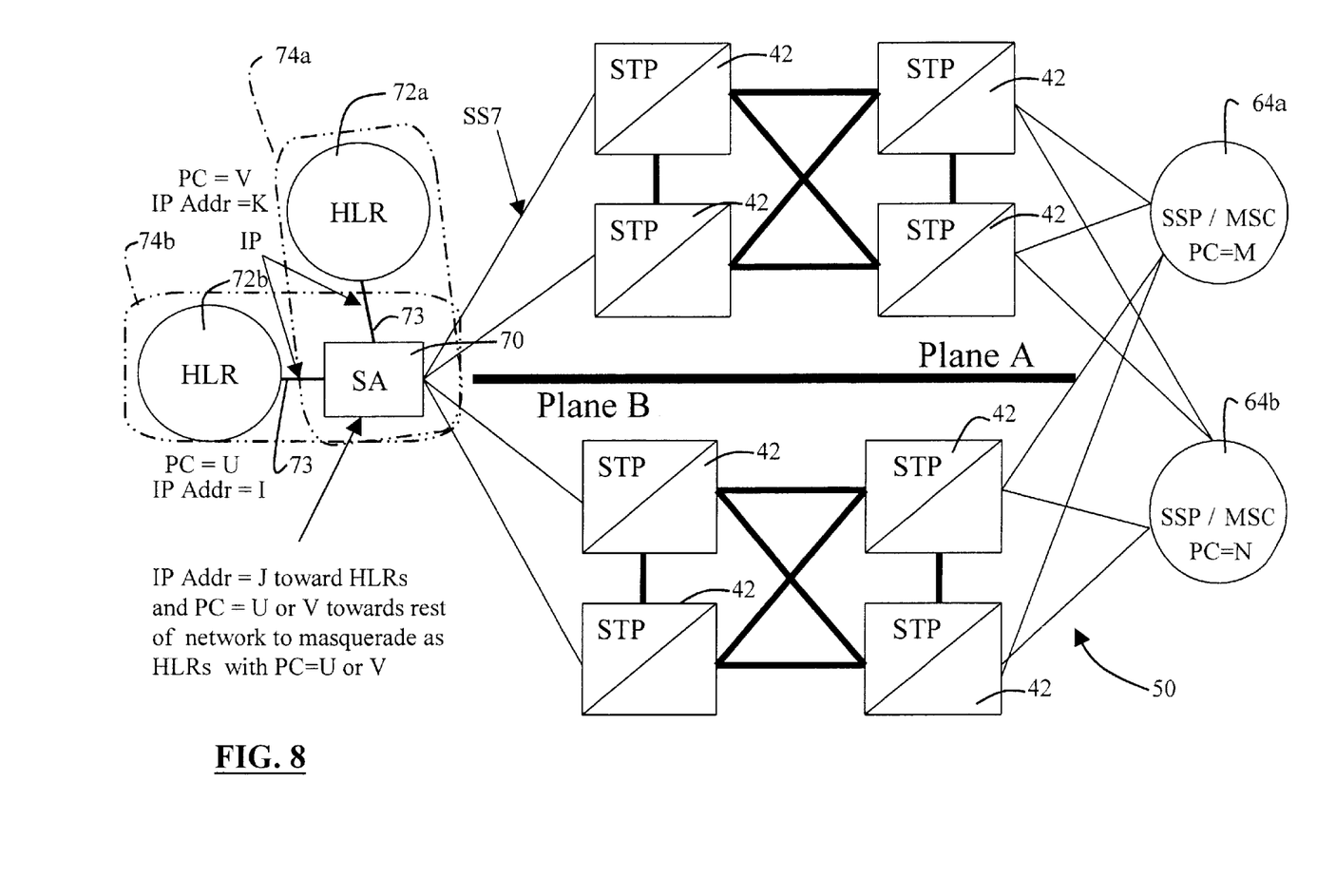
FIG. 8 is a block diagram illustrating a further exemplary MTX telecommunications network in which a Signaling Aggregator in accordance with the invention aggregates signaling message traffic and provides protocol conversion for two network nodes.

FIG. 8 is a schematic diagram illustrating a multiple-plane network 50 in which an SA 70 serves each of two HLRs 72a, 72b, which are both IP devices. The HLR 72a has a point code of "V" and an IP address of "K". The HLR 72b has a point code of "CP" and an IP address of "I". The SA 70 has an IP address of "J" known only to the respective HLRs 72a, 72b and a point code of "C" or "V" towards the rest of the multiple-plane network 50, to mimic the respective HLRs 72a, 72b. The SA 70 in combination with the HLR 72a forms a virtual node 74a which appears to the multiple-plane network 50 as an HLR 72a having a point code of "V". The SA 70 in combination with the HLR 72b forms a virtual node 74b which appears to the multiple-plane network 50 as an HLR having a point code of "U". As also explained above with respect to FIG. 7, the SA 70 further provides message translation services to the respective HLRs 72a, 72b to convert SS7 messages to Internet Protocol format, and vice versa. Otherwise, the multiple-plane network 50 functions as described above, and the SSPs/MSCs 64a, 64b address their respective HLRs 72a, 72b as they would any other node in the multiple-plane network 50.

Figure 9:
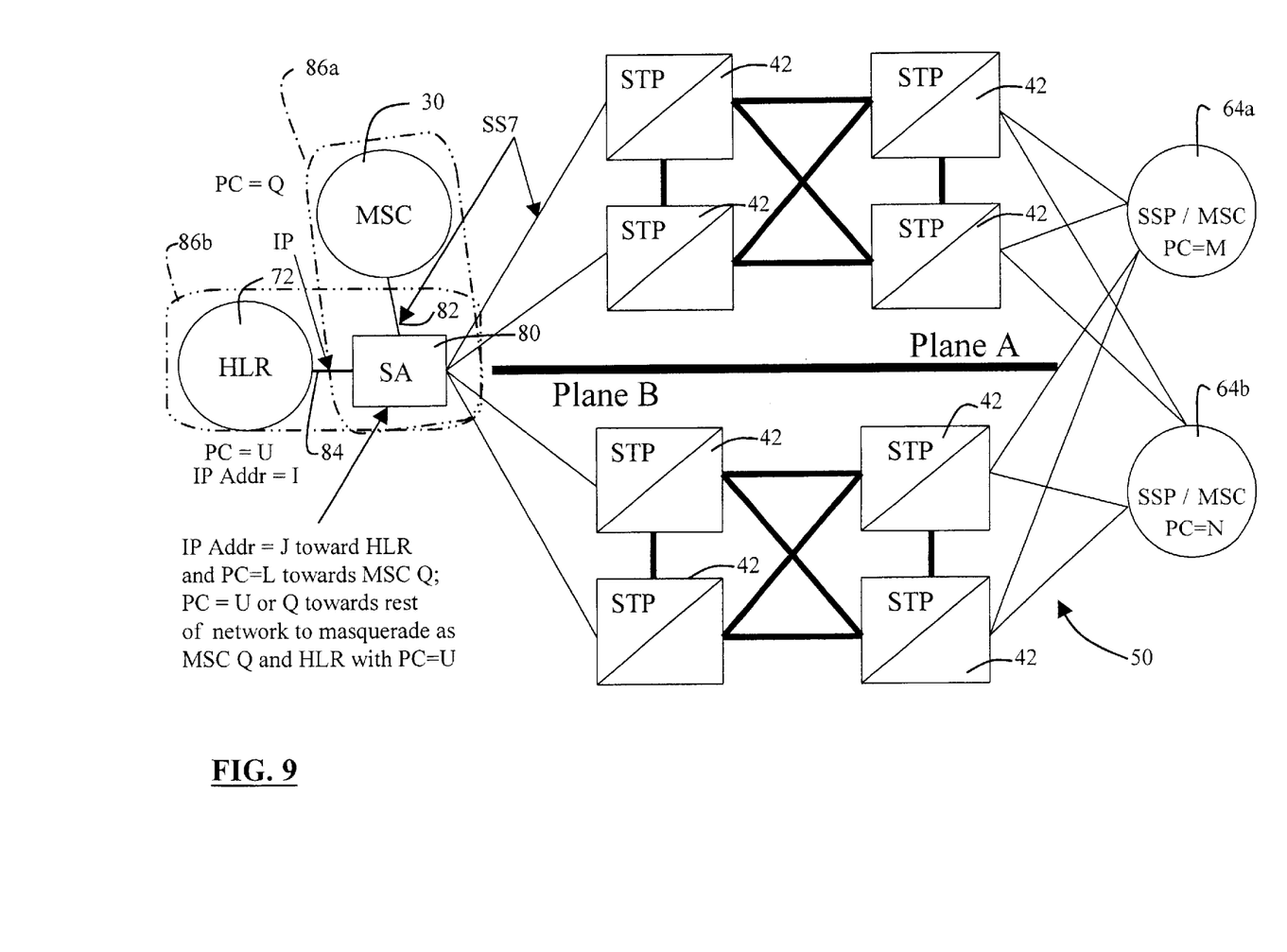
FIG. 9 is a block diagram illustrating a further exemplary MTX telecommunications network provisioned with a Signaling Aggregator in accordance with the invention for aggregating signaling message traffic for two network nodes and providing protocol conversion for one of the two network nodes.

FIG. 9 is a schematic diagram of a multiple-plane network 50 in which an SA 80 in accordance with the invention serves as a Signal Aggregator for an MSC 30 and an HLR 72. The SA 80 therefore provides protocol conversion services to the HLR 72, which is an IP device, and simultaneously serves as a Signal Aggregator for the MSC 30, without protocol conversion. A signaling linkset 82 connecting the SA 80 to the MSC 30 is a high-capacity SS7 linkset. The signaling linkset 84 connecting the SA 80 to the HLR 72 is a high-capacity IP linkset. The MSC has a point code of "Q" while the HLR has a point code of "U". The SA 80 has an IP address of "J" known only to the HLR 72, which has an IP address of "I". The SA 80 has a point code of "L" known by the MSC 30. The SA 80 in combination with the MSC 30 forms a virtual node 86a which appears to the multiple-plane network 50 as an MSC 30 with the point code of "Q". The SA 80 in combination with the HLR 72 forms a virtual node 86b which appears to the multiple-plane network 50 as an SS7-conversant HLR 72 with a point code of "U". The SA 80 therefore uses point code "Q" when sending or receiving SS7 messages for the MSC 30 and a point code "U" when sending or receiving messages for the HLR 72. The SA 80 is therefore adapted to mimic both the HLR 72 and the MSC 30 to the multiple-plane network 50. The transfer of SS7 payload messages and signaling link maintenance messages is performed as described above with reference to FIGS. 6–8.

Figure 10:
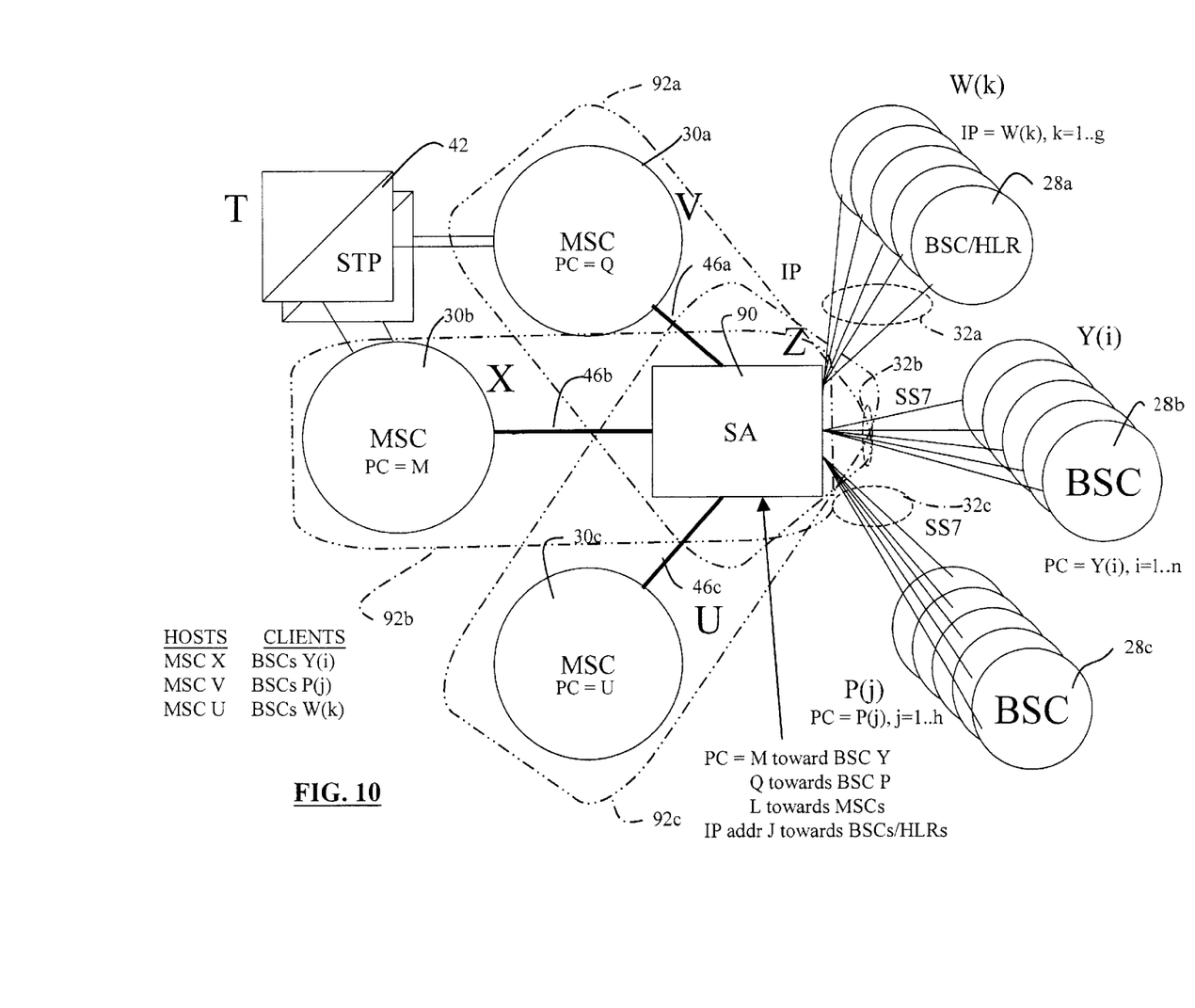
FIG. 10 is a block diagram illustrating a further exemplary GSM telecommunications network provisioned with a Signaling Aggregator in accordance with the invention for aggregating signaling message traffic for a plurality of network nodes.

FIG. 10 shows an embodiment of the invention in which a Signaling Aggregator 90 serves to aggregate control messages exchanged between a plurality of BSCs 28a–c and a plurality of MSCs 30a–c. The respective BSCs/HLRs 28a are connected to a high-capacity SA 90 by a plurality of linksets 32a. The BSCs/HLRs 28a have point codes of W(k). The BSCs/HLRs 28a are IP devices having IP addresses of B(k), k=1 ... g. The BSCs 28b have a point code of Y(i) and are connected to the SA 90 by linksets 32b. The BSCs 28b are SS7 enabled devices with point codes of Y(i), i=1 ... n. The BSCs 28c are connected to the SA 90 by linksets 32c. The BSCs 28c are SS7 enabled devices that have a point code of P(j), j=1 ... h. The SA 90 is connected to the respective MSCs 30a–30c by high-capacity linksets 46a–46c. The SA 90 mimics each of the respective MSCs 30a–30c. Consequently, the SA 90 forms three virtual nodes 92a–c with the respective MSCs 30a–c. The SA 90 uses a point code of "M" towards the BSCs 28b because the MSC 30b controls BSCs 28b. The SA 90 has a point code of "Q" towards the BSCs 28c because the MSC 30a controls BSCs 28c. The SA 90 uses a point of "U" towards BSCs/HLRs 28a because the MSC 30c controls BSCs/HLRs 28a. The SA 90 uses a point code of "L" towards each of the MSCs 30a–30c. The SA 90 also provides protocol conversion for all messages exchanged between the MSC 30c and the BSCs/HLRs 28a, as explained above with reference to FIG. 7.

Figure 11:
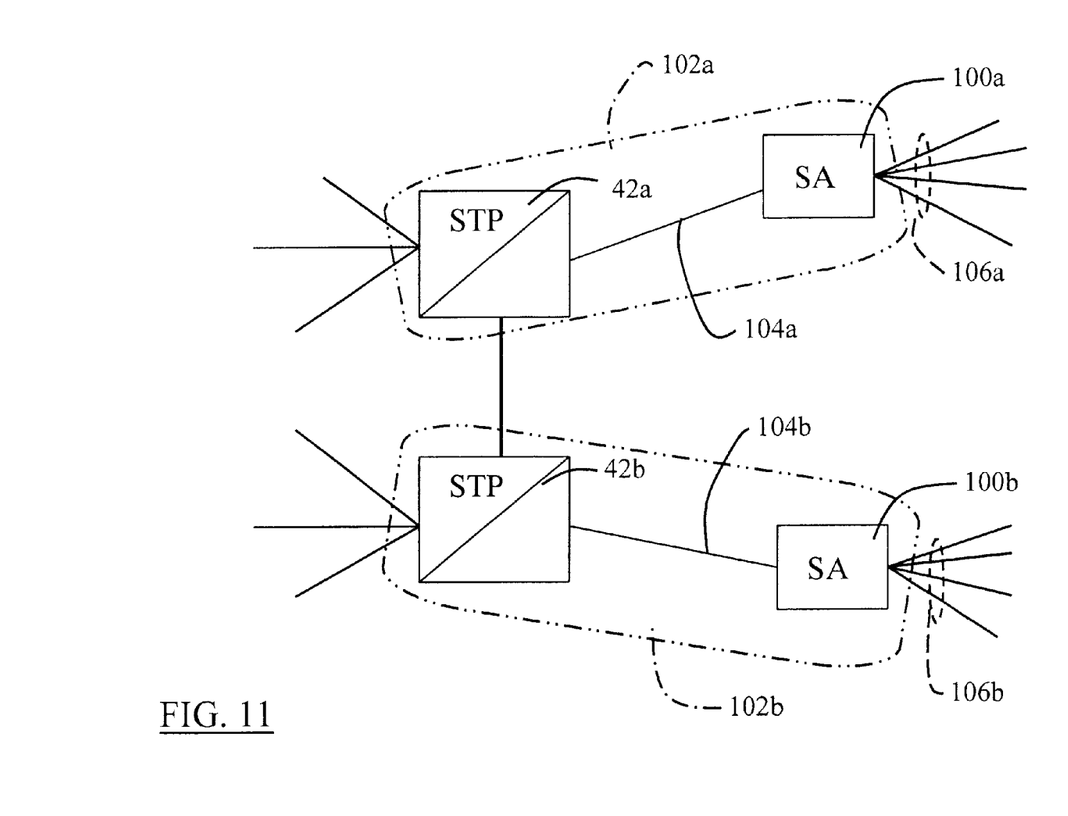
FIG. 11 is a schematic diagram of a portion of a common channel signaling network in which a Signaling Aggregator is used to expand a capacity of a signal transfer point (STP) in the network.

FIG. 11 illustrates another embodiment of the invention that enables the creation of a large Signal Transfer Point (STP) 42 or a distributed STP by connecting one or more Signal Aggregators 100a, 100b to each STP 42a, 42b. The respective SAs 100a, 100b are connected to the STPs 42a, 42b by respective high-capacity signaling linksets 104a, 104b. The SA 100a in combination with the STP 42a forms a virtual STP 102a which is completely transparent to the network. Likewise, SA 100b in combination with STP 42b forms a virtual node 102b which is completely transparent to the rest of the signaling network. Since STPs are generally transparent to the network in any event, the SAs 100a, 100b need only masquerade to the rest of the network when sending or receiving signaling link management messages and simply forward payload signaling messages received from other nodes over linksets 106a, 106b to the respective STPs 42a, 42b via linksets 104a, 104b. Likewise, messages received from the respective STPs 42a, 42b are forwarded over the appropriate linksets 106a, 106b based on the destination point code (DPC) of the message using message routing tables well known in the art. For the purposes of MTP signaling, the SA 100a has a point code known only to STP 42a, and mimics the STP 42a to other nodes connected to the signaling linksets 106a. SA 100b likewise mimics STP 42b to other network nodes connected to the signaling linksets 106b for the purposes of signaling link maintenance using MTP messages.

The Signaling Aggregator in accordance with the invention therefore provides a versatile new element for use in a telecommunications signaling network. Although the invention has been described with particular reference to SS7 common channel signaling networks, it will be understood by those skilled in the art that the same principles may be applied to utilize the Signaling Aggregator in accordance with the invention in any out-of-band signaling network. It should also be understood that the uses of the Signaling Aggregator described above is not an exhaustive list. The Signaling Aggregator may be used in any configuration in a out-of-band signaling network in which transparent signal message aggregation and/or protocol conversion are beneficial.

The embodiments of the invention described above are therefore intended to be exemplary only and the scope of the invention is to be limited solely by the scope of the appended claims.

We claim:

1. A signaling aggregator for use in a out-of-band signaling network to relieve port exhaustion at a first node that requires a connection to a plurality of signaling links connected to other nodes in the network, the signaling aggregator comprising:

a) a plurality of signaling ports for terminating at least some of the plurality of signaling links connected to the other nodes in the network, and at least one signaling port for terminating at least one signaling link connected to the first node; and b) an aggregator proxy for transparently transferring selected signaling messages between the first node and the other nodes, the aggregator proxy masquerading as the first node to the other nodes.

2. The signaling aggregator as claimed in claim 1, wherein the signaling network is a common channel signaling network.

3. The signaling aggregator as claimed in claim 2, wherein the common channel signaling network operates under a Signaling System #7 (SS7) protocol.

4. The signaling aggregator as claimed in claim 3, wherein each of the first node and the other nodes has a point code used to address signaling messages to the respective nodes, and the signaling aggregator masquerades as the first node using the point code of the first node in an origination point code field (OPC) of signaling messages forwarded to the other nodes.

5. The signaling aggregator as claimed in claim 4, wherein the signaling aggregator is assigned a second point code used for exchanging signaling messages with the first node.

6. The signaling aggregator as claimed in claim 1, wherein the signaling aggregator is further adapted to perform protocol conversion, to convert the selected signaling messages transferred from a first signaling protocol used by the first node to a second signaling protocol used by the other nodes.

7. The signaling aggregator as claimed in claim 1, wherein the first node is a mobile switching center (MSC) in a switched telephone network.

8. The signaling aggregator as claimed in claim 7, wherein the other nodes are base station controllers (BSCs) in switched telephone network.

9. The signaling aggregator as claimed in claim 1, wherein the first node is one of a home location register (HLR) and a visitor location register (VLR) in a switched telephone network.

10. The signaling aggregator as claimed in claim 9, wherein the one of the HLR and the VLR are Internet Protocol (IP) devices.

11. The signaling aggregator as claimed in claim 1, wherein the first node is a signal transfer point (STP) in a switched telephone network.

12. The signaling aggregator as claimed in claim 1, wherein the first node is a service switching point (SSP) in a switched telephone network.

13. The signaling aggregator as claimed in claim 1, wherein the first node is a service control point (SCP) in a switched telephone network.

14. The signaling aggregator as claimed in claim 1, wherein at least one high-capacity signaling linkset has sufficient capacity to achieve at least a 2:1 compression of the signals transferred from the signaling aggregator to the first node.

15. The signaling aggregator as claimed in claim 1, wherein the signaling aggregator supports a plurality of high-capacity links.

16. The signaling aggregator as claimed in claim 15, wherein the plurality of high capacity links are connected to a plurality of first nodes.

17. The signaling aggregator as claimed in claim 16, wherein the first nodes perform different functions.

18. The signaling aggregator as claimed in claim 17, wherein at least one of the first nodes operates under a different protocol than others of the first nodes.

19. The signaling protocol as claimed in claim 18, wherein the signaling aggregator is adapted to provide protocol conversion for at least one of the first signaling nodes that operates under a different protocol.

20. The method as claimed in claim 15, of provisioning the signaling aggregator with a port that supports a high-capacity linkset that operates under a different protocol than a signaling protocol of a signaling network.

21. The method as claimed in claim 20, further comprising a step of connecting a node to the port using the high-capacity linkset.

22. The method as claimed in claim 21, further comprising a step of performing protocol conversion on the messages transparently transferred through the signaling aggregator.

23. The method as claimed in claim 22, wherein the protocol conversion comprises a step of converting Signaling System #7 (SS7) messages to Internet Protocol (IP) messages, and vice versa.

24. A method of reducing signaling port exhaustion at a first signaling node in an out-of-band signaling network, the first signaling node requiring a plurality of signaling links respectively connected to a plurality of second signaling nodes in the network, comprising steps of:
  a) connecting at least a portion of the plurality of signaling links to a signaling aggregator adapted to masquerade as the first signaling node to the plurality of second signaling nodes;
  b) interconnecting the first signaling node and the signaling aggregator using at least one signaling linkset; and
  c) transparently transferring selected signaling messages through the signaling aggregator.

25. The method as claimed in claim 24, wherein the step of transparently transferring selected messages is performed by an aggregator proxy that transparently transfers all payload signaling messages between the first signaling node and the plurality of second signaling nodes.

26. The method as claimed in claim 25, wherein the aggregator proxy does not transfer selected link state maintenance messages between the first signaling node and the plurality of second signaling nodes.

27. The method as claimed in claim 24, wherein the step of masquerading comprises sending signaling messages from the signaling aggregator using an originating point code (OPC) of the first signaling node, and accepting signaling messages at the signaling aggregator having a destination point code of the first signaling node.

28. The method as claimed in claim 27, further comprising a step of sending link state maintenance messages from the signaling aggregator to the first signaling node using an originating point code (OPC) associated with the signaling aggregator, but known only to the first signaling node.

29. The method as claimed in claim 27, further comprising a step of sending link state maintenance messages from the signaling aggregator to the plurality of second signaling nodes using an originating point code (OPC) of the first signaling node to masquerade as the first signaling node.

* * * * *